United States Patent
Ljung (10) Patent No.: US 11,206,251 B2
(45) Date of Patent: Dec. 21, 2021

(54) SYSTEM AND METHOD FOR COMMUNICATING INFORMATION ABOUT A SERVICEABLE ITEM

(71) Applicant: Sony Mobile Communications Inc., Tokyo (JP)

(72) Inventor: Peter Ljung, Lund (SE)

(73) Assignee: Sony Mobile Communications Inc., Tokyo (JP)

(*) Notice: Subject to any disclaimer, the term of this patent is extended or adjusted under 35 U.S.C. 154(b) by 384 days.

(21) Appl. No.: 16/361,334

(22) Filed: Mar. 22, 2019

(65) Prior Publication Data
US 2019/0349355 A1  Nov. 14, 2019

(30) Foreign Application Priority Data
May 11, 2018  (SE) ..................... 1830159-8

(51) Int. Cl.
*H04L 29/06* (2006.01)
*H04L 29/08* (2006.01)
*H04W 4/80* (2018.01)

(52) U.S. Cl.
CPC ........ *H04L 63/0807* (2013.01); *H04L 63/083* (2013.01); *H04L 63/0853* (2013.01); *H04L 63/108* (2013.01); *H04L 67/146* (2013.01); *H04W 4/80* (2018.02)

(58) Field of Classification Search
CPC .............. H04L 63/0807; H04L 63/083; H04L 63/0853; H04L 63/108; H04L 63/08; H04L 63/0869; H04L 67/146; H04W 4/80
See application file for complete search history.

(56) References Cited

U.S. PATENT DOCUMENTS

| 7,954,150 B2* | 5/2011 | Croft ..................... G06F 3/1415 726/21 |
| 8,051,180 B2* | 11/2011 | Mazzaferri ........... G06F 3/1438 709/227 |
| 8,341,270 B2* | 12/2012 | Mazzaferri ............. H04L 67/16 709/227 |
| 8,462,947 B2* | 6/2013 | Naslund .............. H04W 12/062 380/247 |

(Continued)

FOREIGN PATENT DOCUMENTS

| EP | 1278334 A2 | 1/2003 |
| GB | 2554696 A | 4/2018 |

OTHER PUBLICATIONS

Swedish Search Report from correlating Swedish Application No. 1830159-8, dated Nov. 29, 2018; 9 pages.

*Primary Examiner* — Hosuk Song
(74) *Attorney, Agent, or Firm* — Tucker Ellis LLP (57) ABSTRACT

A first electronic device is associated with a serviceable item. The first electronic device includes a user input; an output device; and a control circuit. The first electronic device is configured to identify user interaction with the user input; generate a code unique to the user interaction with the user input; and output, via the output device and to a second electronic device associated with the user, a temporary session identifier comprising the code, the temporary session identifier useable by the second device to establish a communication session with a server. The user may communicate information about the serviceable item to the server over the communication session in an attempt to facilitate servicing of the serviceable item.

20 Claims, 3 Drawing Sheets

(56) References Cited

U.S. PATENT DOCUMENTS

| | | | |
|---|---|---|---|
| 9,237,133 B2 * | 1/2016 | Kruglick | H04L 63/0428 |
| 9,521,548 B2 * | 12/2016 | Fosmark | H04W 12/06 |
| 9,686,255 B2 * | 6/2017 | Rafiq | H04L 63/08 |
| 10,084,763 B2 * | 9/2018 | Panton | H04L 63/18 |
| 2003/0097564 A1 | 5/2003 | Tewari | |
| 2006/0184818 A1 | 8/2006 | Nawa | |
| 2017/0180351 A1 * | 6/2017 | Lu | H04L 67/146 |

* cited by examiner

SYSTEM AND METHOD FOR COMMUNICATING INFORMATION ABOUT A SERVICEABLE ITEM

RELATED APPLICATION DATA

This application claims the benefit of Swedish Patent Application No. 1830159-8, filed May 11, 2018, the disclosure of which is incorporated herein by reference in its entirety.

TECHNICAL FIELD OF THE INVENTION

The technology of the present disclosure relates generally to electronic devices and, more particularly, to a system and method for communicating information about a serviceable item, such as to facilitate service of the serviceable item and establish a communication channel between a user device and a server to allow for additional interaction concerning the serviceable item.

BACKGROUND

Devices sometimes fail, need service or run out of consumable supplies, or a user sometimes needs assistance when using a device. Exemplary devices of this nature are electronic devices (e.g., coffee makers, vending machines, self-service kiosks or computer terminals, etc.), office equipment (e.g., copiers, printers, scanners, etc.), medical equipment (e.g., patient monitors, etc.), industrial equipment (e.g., manufacturing machines, farm equipment, robots, etc.), and rental vehicles (e.g., bicycles, cars, etc.). These are just a few examples of the types of devices with which a user might interact. Devices of this nature will be generally referred to as an "appliance" in this document.

To assist the user, some appliances include a label with information to contact a service provider. Exemplary information may include contact information and device-identifying information. Contact information may be a telephone number, a website address, a quick response (QR) code, etc. Device-identifying information may be a model number of the appliance, a unique identifier of the appliance (e.g., a serial number or an inventory code), a location of the appliance, etc. In some instances, the contact information and the device-identifying information may be combined, such as a QR code that directs a scanning user device (e.g., a mobile telephone) to a website and that contains data to identify the specific appliance to the host of the website.

The foregoing provides a basic level of assist to the user. But the approaches are limited in that there is no communication of status information from the appliance to the server. Nor is the conventional solution secure since any person having the information from the appliance may report an issue with the appliance and that person need not be located at the location of the appliance if the information is acquired before initiating communication.

In a more advanced solution, the appliance has a user input, such as a dedicated button. When the button is pressed, the appliance communicates with a service to indicate that there is an issue. In some instances, a service person may be dispatched to the location of the appliance to address the issue. But this approach still has limitations. For instance, a single button press does not report the nature of the issue. Nor is the identity or contact information for the person that pressed the button communicated to the server.

SUMMARY

The disclosed systems and methods provide a solution for simple and secure service feedback mechanism using an interface feature (e.g., a touch button) on an electronic device associated with a serviceable item. After a user interacts with the interface feature, the electronic device may establish communication with a server to submit an issue report or service request to the server. Also, temporary session information may be communicated to another device (e.g., a mobile telephone of the user) that the user may employ to engage in communications with the server. In this manner, the user may interface with a support function offered by a support server, which may be automated in the server or may include human operator involvement. Also, the session information may limit illegitimate communication between a user device and the server.

According to one aspect of the disclosure, a first electronic device associated with a serviceable item, includes: a user input; an output device; and a control circuit, configured to: identify user interaction with the user input; generate a code unique to the user interaction with the user input; and output, via the output device and to a second electronic device associated with the user, a temporary session identifier comprising the code, the temporary session identifier useable by the second device to establish a communication session with a server.

According to one embodiment of the first electronic device, the code comprises one of a random character sequence or a cryptographic key.

According to one embodiment of the first electronic device, the code or the temporary session identifier is transmitted to the server by the first electronic device.

According to one embodiment of the first electronic device, the temporary session identifier includes an authenticated session ID generated from a secret key shared between first electronic device and the server.

According to one embodiment of the first electronic device, the first electronic device transmits data identifying a state of the serviceable item at the time of the user interaction with the user input to the server.

According to one embodiment of the first electronic device, the output device has limited operative range to output the temporary session identifier, such as the output device comprising a near field communication (NFC) interface, a Bluetooth interface, a Bluetooth Low Energy (BLE) interface or a display on which an image encoded with the temporary session identifier is displayed.

According to one embodiment of the first electronic device, the display is a low power technology display, such as an electronic ink display.

According to one embodiment of the first electronic device, the temporary session identifier is or is appendable to an address of the server, such as a uniform resource locator or URL.

According to another aspect of the disclosure, a method, performed by a first electronic device associated with a serviceable item, includes: identifying a user interaction with the first electronic device; generating a code unique to the user interaction; and outputting a temporary session identifier comprising the code, the temporary session identifier useable by a second electronic device associated with a user to establish a communication session with a server.

According to one embodiment of the method, the method further includes transmitting the code or the temporary session identifier to the server.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Introduction

Described below, in conjunction with the appended figures, are various embodiments of systems and methods for communicating information about a serviceable item, such as to facilitate service of the serviceable item and to establish a communication channel between a user device and a server to allow for additional interaction concerning the serviceable item.

The serviceable item may be an appliance. As indicated above, the appliance may be any type of device and need not include electronics (e.g., in the case of a bicycle). Typically, the appliance is a type of device that might develop a service issue such as breaking, malfunctioning, requiring routine service or unscheduled service, or running out of a consumable supply. Exemplary devices of this nature are electronic devices (e.g., coffee makers, vending machines, self-service kiosks or computer terminals, etc.), office equipment (e.g., copiers, printers, scanners, etc.), medical equipment (e.g., patient monitors, etc.), industrial equipment (e.g., manufacturing machines, farm equipment, robots, etc.), and rental vehicles (e.g., bicycles, cars, etc.). In other situations, the serviceable item may be a place, an eating environment (e.g., a table at a restaurant), a sales environment (e.g., a display in a retail store), or some other situs where service or assistance may be desirable. For example, the situs may be a place that needs cleaning or other service such as a hotel room, a public restroom, or a conference room. It will be understood that the exemplary serviceable items identified herein are non-limiting of the articles or places that may be associated with a first electronic device as discussed in greater detail below. The serviceable item may related to any item or place involved in supply flow, waste flow, workflow, customer service, equipment support, and so forth.

Therefore it will be understood that the term "serviceable item" is used broadly in this document. The serviceable item is associated with an electronic device, which is often referred to in this document as a first electronic device. The first electronic device may be integrated into the serviceable item, such as being a part of other electronics of an appliance or retained by a housing of an appliance. In other embodiments, the first electronic device is added onto or attached to the serviceable item, mounted on a wall, etc.

System Architecture

Figure 1:
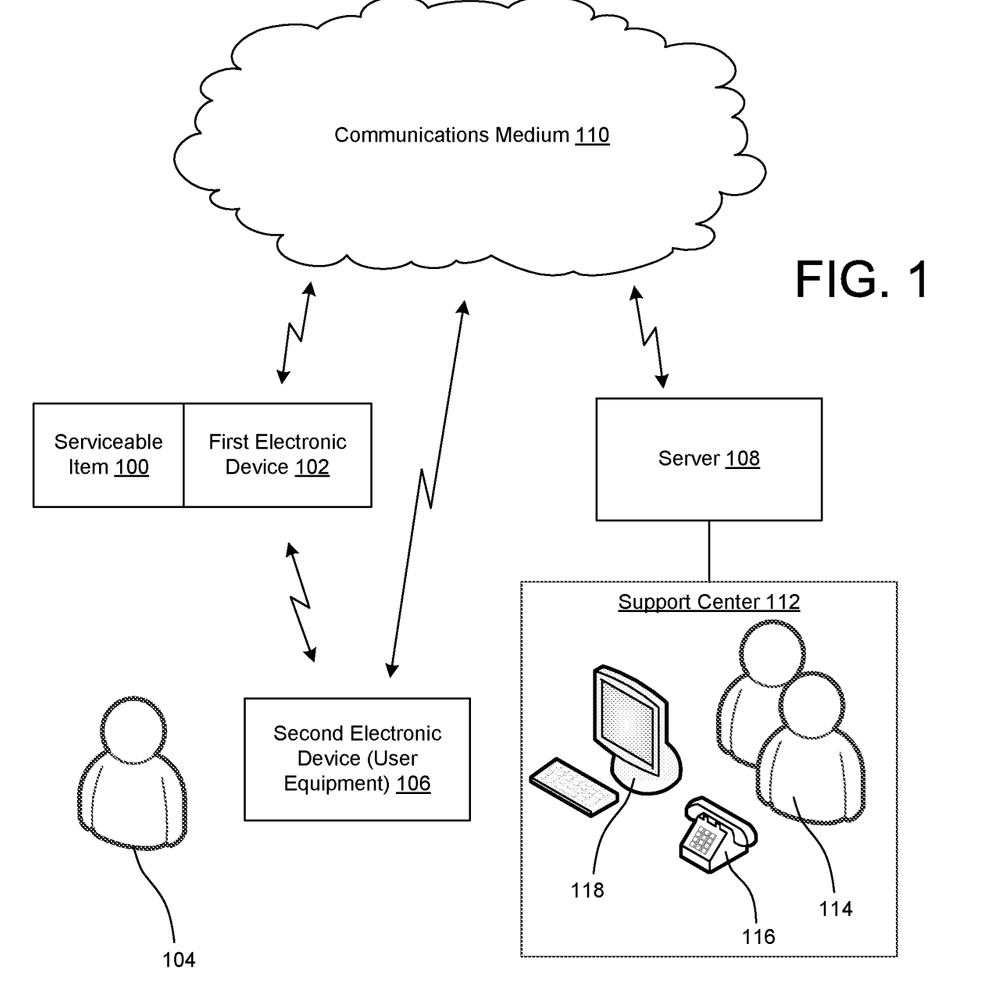
FIG. 1 is a schematic diagram of an operational environment for an electronic device that is associated with a serviceable item.

FIG. 1 is a schematic diagram of an exemplary system for implementing the disclosed techniques. It will be appreciated that the illustrated system is representative and other systems may be used to implement the disclosed techniques. Also, functions disclosed as being carried out by a single device, such as the disclosed server, may be carried out in a distributed manner across nodes of a computing environment.

The system includes a serviceable item 100. A first electronic device 102 is associated with the serviceable item 100. For instance, the first electronic device 102 may form part of the serviceable item 100 or may be attached to the serviceable item 100. A user 104 may interact with the serviceable item 100 to use the serviceable item 100 for the tasks for which the serviceable item 100 is intended to carry out. Should an issue arise in attempting to use the serviceable item 100, the user 104 may interact with the first electronic device 102 to initiate a service notice function carried out by the first electronic device 102 as will be described in greater detail in later sections of this document.

A second electronic device 106 is associated with the user 104. The second electronic device 106 may be an electronic device that the user 104 often has on his or her possession. For instance, the second electronic device 106 may be a portable device such as a mobile radiotelephone (a "smartphone") and may sometimes be referred to as a user equipment or UE. Other exemplary second electronic devices 106 include, but are not limited to, a tablet computing device and a computer.

At times, one or both of the first electronic device 102 and the second electronic device 106 may be in operative communication with a server 108 via a communications medium 110. The communications medium 110 generically represents any communication pathway between the first electronic device 102 and server 108 and any communication pathway between the second electronic device 106 and the server 108. For example, the communications 110 may include one or more networks, such as a subscriber network (e.g., a cellular network), a local area network (e.g., a WiFi network), the Internet, etc. The communications medium 110 also may include connectivity nodes to support various wireless connections such as, but not limited to a Bluetooth Low Energy (BLE) observer or other node through which the first electronic device 102 may communicate using machine-to-machine (M2M) communications or machine-type communications (MTC).

As will be described, the first electronic device 102, the second electronic device 106, and the server 108 are configured to carry out the respective logical functions that are described herein. One function performed by the server 108 may be to pass on information from the first electronic device 102 and/or the second electronic device 106 to a support center 112 and pass on information from the support center 112 to the first electronic device 102 and/or the second electronic device 106. The support center 112 may allow support persons 114 to communicate with the user 104 by way of the second electronic device 106 by voice using calls made with a telephone 116 or by way of electronic communication (e.g., email, text message, chat session, web interaction, etc.) using a computing platform 118. The server 108 and/or the computing platform 118 also may carry out automated interactions with the second electronic device 106.

Figure 2:
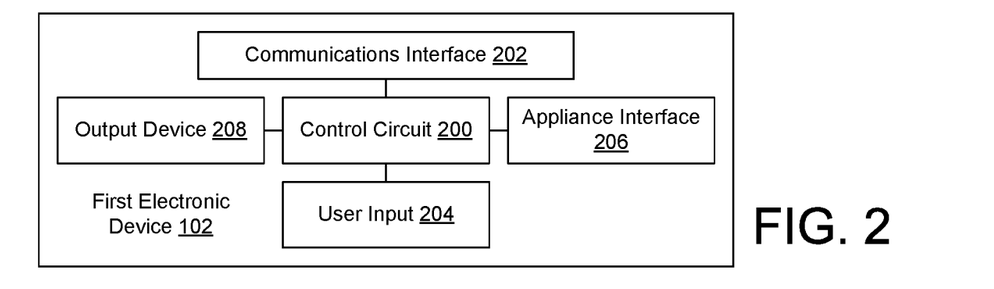
FIG. 2 is a schematic diagram of the electronic device that is associated with the serviceable item.

With additional reference to FIG. 2, illustrated is a schematic block diagram of the first electronic device 102. The first electronic device 102 may include various components to carry out its functions and operations. For instance, the first electronic device 102 may include a control circuit 200 that is responsible for overall operation of the first electronic device 102. The control circuit 200 may include a logic execution circuit, such as a processor, that executes code to carry out various functions of the first electronic device 102. Logical functions and/or hardware of the control circuit 200 may be implemented in other manners depending on the nature and configuration of the first electronic device 102. Therefore, the illustrated and described approaches are just examples and other approaches may be used including, but not limited to, the control circuit 200 being implemented as, or including, hardware (e.g., a microprocessor, microcontroller, central processing unit (CPU), etc.) or a combination of hardware and software (e.g., a system-on-chip (SoC), an application-specific integrated circuit (ASIC), field programmable gate array (FPGA), etc.).

In one embodiment, code executed by the control circuit 200 and data stored by the first electronic device 102 may be stored by a memory portion of the control circuit 200. The stored data may include, but is not limited to, data associated with the service notice function of the first electronic device 102. The memory may be, for example, one or more of a buffer, a flash memory, a hard drive, a removable media, a volatile memory, a non-volatile memory, a random access memory (RAM), or other suitable device. In a typical arrangement, the memory includes a non-volatile (persistent) memory for long term data storage and a volatile memory that functions as system memory for the control circuit 200. The memory is considered a non-transitory computer readable medium.

The first electronic device 102 may include a communications interface 202 to establish operative communication with the server 108 via the communications medium 110. The communications interface 202 may support one or more interface technologies such as, but not limited to, USB, Bluetooth, BLE, WiFi, cellular protocol (e.g., 3G, 4G or 5G), etc.

The first electronic device 102 may include a user input 204. The user input 204 may be a button that, when pressed by the user 104, inputs a corresponding signal to the control circuit 200. The user input 204 may be implemented in other manners, such a soft-button or menu choice displayed on touch interface.

The first electronic device 102 also may include an interface 206 to other electronics of the serviceable item 100, such as a sensor that detects a condition that indicates service is needed or a consumable has or is about to be depleted. The serviceable item 100 may be capable of detecting multiple different conditions, and the various different conditions may be communicated to the first electronic device 102 via the interface 206.

The first electronic device 102 may include an output device 208. The output device 208 outputs data, as will be described below, to the second electronic device 106. The data may be output visually, in which case the output device 208 may be a display. In one embodiment, the display is a low power consumption display, such as an electronic ink display. In other embodiments, the data may be output in a transmitted communication signal, in which case the output device 208 is a communication interface such as an NFC chipset, BLE interface, ultrasound or infrared transponder, or other wireless or wired interface, or combined with the communications interface 202.

In the case where the serviceable item is an appliance that includes its own electronics, the first electronic device 102 and any electronics of the serviceable item 100 for carrying out functions of the serviceable item 100 are separate. In another embodiment, all or some of the components of the first electronic device 102 are combined with electronics of the serviceable item 100 that carry out functions of both the first electronic device 102 and the serviceable item 100.

Figure 3:
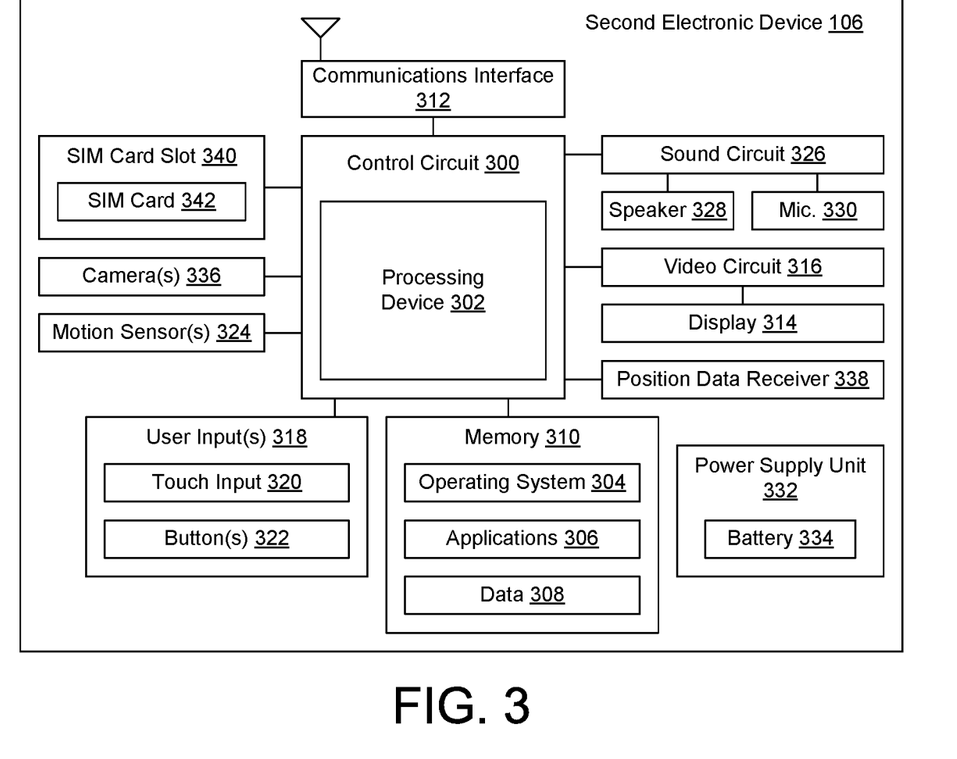
FIG. 3 is a schematic diagram of an electronic device that is associated with a user.

With additional reference to FIG. 3, illustrated is a schematic block diagram of the second electronic device 106 in its exemplary form as a mobile telephone. The second electronic device 106 includes a control circuit 300 that is responsible for overall operation of the second electronic device 106, including controlling the second electronic device 106 to carry out the operations described in greater detail below. The control circuit 300 includes a processor 302 that executes an operating system 304 and various applications 306. The functions described in this disclosure document may be embodied as part of the operating system 304, as part of a dedicated application 306 and/or part of an application 306 used for other tasks.

The operating system 304, the applications 306, and stored data 308 (e.g., data associated with the operating system 304, the applications 306, and user files), are stored by a memory 310. The operating system 304 and applications 306 are embodied in the form of executable logic routines (e.g., lines of code, software programs, etc.) that are stored on a non-transitory computer readable medium (e.g., the memory 310) of the second electronic device 106 and are executed by the control circuit 300.

The processor 302 of the control circuit 300 may be a central processing unit (CPU), microcontroller, or microprocessor. The processor 302 executes code stored in a memory (not shown) within the control circuit 300 and/or in a separate memory, such as the memory 310, in order to carry out operation of the second electronic device 106. The memory 310 may be, for example, one or more of a buffer, a flash memory, a hard drive, a removable media, a volatile memory, a non-volatile memory, a random access memory (RAM), or other suitable device. In a typical arrangement, the memory 310 includes a non-volatile memory for long term data storage and a volatile memory that functions as system memory for the control circuit 300. The memory 310 may exchange data with the control circuit 300 over a data bus. Accompanying control lines and an address bus between the memory 310 and the control circuit 300 also may be present. The memory 310 is considered a non-transitory computer readable medium.

The second electronic device 106 includes one or more communications interfaces 312 that enable the second electronic device 106 to establish various communication connections. In the exemplary embodiment, the communications interfaces 312 include a radio circuit with one or more radio frequency transceivers and an antenna assembly (or assemblies). In the case that the second electronic device 106 is a multi-mode device capable of communicating using more than one standard or protocol, over more than one radio access technology (RAT) and/or over more than one radio frequency band, the radio circuit represents one or more than one radio transceiver, one or more than one antenna, tuners, impedance matching circuits, and any other components needed for the various supported frequency bands and radio access technologies. Exemplary network access technologies supported by the radio circuit include cellular circuit-switched network technologies and packet-switched network technologies. The radio circuit further represents any radio transceivers and antennas used for local wireless communications directly with another electronic device, such as over a Bluetooth interface, BLE interface, NFC interface, etc.

The second electronic device 106 further includes a display 314 for displaying information to the user 104. The display 314 may be coupled to the control circuit 300 by a video circuit 316 that converts video data to a video signal used to drive the display 314. The video circuit 316 may include any appropriate buffers, decoders, video data processors, and so forth.

The second electronic device 106 may include one or more user inputs 318 for receiving user input for controlling operation of the second electronic device 106. Exemplary user inputs 318 include, but are not limited to, a touch sensitive input 320 that overlays or is part of the display 314 for touch screen functionality, and one or more buttons 322. Other types of data inputs may be present, such as one or more motion sensors 324 (e.g., gyro sensor(s), accelerometer(s), etc.).

The second electronic device 106 may further include a sound circuit 326 for processing audio signals. Coupled to the sound circuit 326 are a speaker 328 and a microphone 330 that enable audio operations that are carried out with the second electronic device 106 (e.g., conduct telephone calls, output sound, capture audio, etc.). The sound circuit 326 may include any appropriate buffers, encoders, decoders, amplifiers, and so forth.

The second electronic device 106 may further include a power supply unit 332 that includes a rechargeable battery 334. The power supply unit 332 supplies operational power from the battery 334 to the various components of second electronic device 106 in the absence of a connection from the second electronic device 106 to an external power source.

The second electronic device 106 also may include various other components. For instance, the second electronic device 106 may include one or more input/output (I/O) connectors (not shown) in the form electrical connectors for operatively connecting to another device (e.g., a computer, an audio accessory, the serviceable item 100 or the first electronic device 102) via a cable, or for receiving power from an external power supply.

Another exemplary component may be one or more cameras 336 for taking photographs or video, for scanning bar codes or QR codes, or for use in video telephony. As another example, a position data receiver 338, such as a global positioning system (GPS) receiver, may be present to assist in determining the location of the second electronic device 106. The second electronic device 106 also may include a subscriber identity module (SIM) card slot 340 in which a SIM card 342 is received. The slot 340 includes any appropriate connectors and interface hardware to establish an operative connection between the second electronic device 106 and the SIM card 340.

Figure 4:
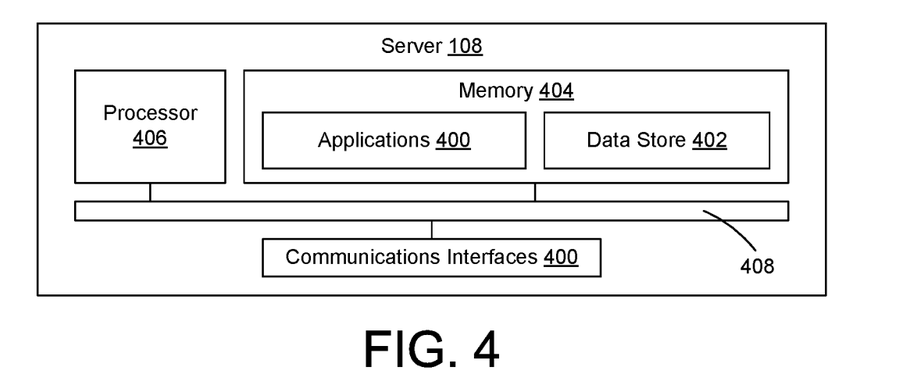
FIG. 4 is a schematic diagram of a server that communicates with the electronic device that is associated with the serviceable item and the electronic device that is associated with the user.

With additional reference to FIG. 4, illustrated is a schematic block diagram of the server 108. The server 108 may be implemented as a computer-based system that is capable of executing computer applications 400 (e.g., software programs) that, when executed, carry out functions of the server 108. The applications 400 and a data store 402 may be stored on a non-transitory computer readable medium, such as a memory 404. The data store 402 may be used to store various information sets used by the server 108. The memory 404 may be a magnetic, optical or electronic storage device (e.g., hard disk, optical disk, flash memory, etc.), and may comprise several devices, including volatile and non-volatile memory components. Accordingly, the memory 404 may include, for example, random access memory (RAM) for acting as system memory, read-only memory (ROM), solid-state drives, hard disks, optical disks, flash devices and/or other memory components, plus associated drives, players and/or readers for the memory devices.

To execute logical operations, the server 108 may include one or more processors 406 used to execute instructions that carry out logic routines. The processor 406 and the memory 404 may be coupled using a local interface 408. The local interface 408 may be, for example, a data bus with accompanying control bus, a network, or other subsystem.

The server 108 may have various input/output (I/O) interfaces for operatively connecting to various peripheral devices, as well as one or more communications interfaces 410. The communications interface 410 may include for example, a modem and/or a network interface card. The communications interface 410 may enable the server 108 to send and receive data signals to and from other computing devices via an external network. In particular, the communications interface 410 may operatively connect the server 108 to one or more external communications mediums, including communications medium 110.

Service Notice at Appliance

Figure 5:
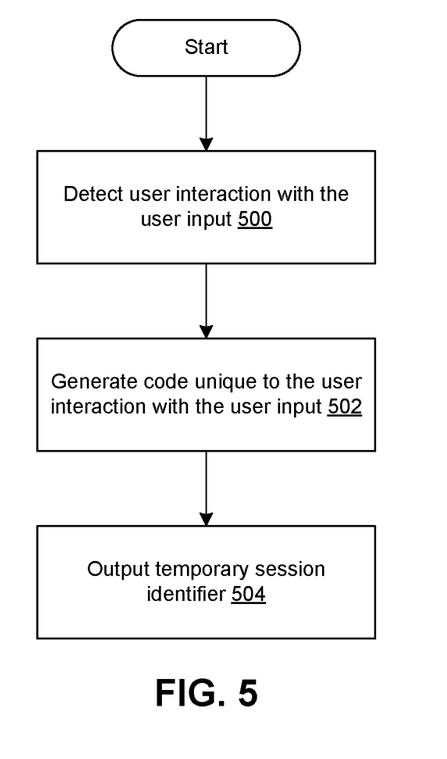
FIG. 5 is an exemplary flow-diagram of a service notice function carried out by the electronic device that is associated with the serviceable item.

With additional reference to FIG. 5, shown is an exemplary flow diagram representing steps that may be carried out by the first electronic device 102 when executing logical instructions to carry out service notification functions at the serviceable item 100. FIG. 5 illustrates an exemplary process flow representing steps that may be carried out by the first electronic device 102. Complimentary operations of the second electronic device 106 and/or the server 108 also will be understood from this disclosure. Although illustrated in a logical progression, the illustrated blocks of FIG. 5 may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 500 where the first electronic device 102 monitors output from the user input 204 for user interaction with the user input 204. For example, in the embodiment where the user input 204 is a depressible button or touch reactive key, the user may press the user input 204, which results in a corresponding signal input to the control circuit 200. Upon identification of user interaction with the user input 204, the logical flow may proceed to block 502.

In block 502, the first electronic device 102 generates a code that is unique to the user interaction with the user input 204. The code made include a variable portion that is not predetermined, so as to be unknown by the user 104 and difficult to guess. In one embodiment, the variable portion is or includes a sequence of random characters (e.g., numbers and/or letters). The sequence of random characters may be of a predetermined length. In another embodiment, the variable portion is or includes the current date and/or a current time, or is derived from the current date and/or the current time. The code also may include a predetermined portion, such as an identifier of the application 100.

In one embodiment, the code and an identifier of the first electronic device 102 or the serviceable item 100 are transmitted to the server 108. The code and identifier may be transmitted in any appropriate manner, such as transmitting the code in a message or as part of a communication session established between the first electronic device 102 and the server 108. The code may be transmitted in an encrypted format. Other information may be transmitted to the server. For example, if there are several user inputs 204 corresponding to different conditions of the serviceable item 100, the identity of the user input 204 with which the user 104 interacted may be transmitted. In one embodiment, the number of button presses may signal the type of issue that the serviceable item 100 is experiencing. In this case, the number of button presses may be communicated to the server 108. Other information may include an identity of the serviceable item 100, a location of the serviceable item 100, a current time and/or date, a data value acquired via the appliance interface 206 and that indicates one or more sensed operational states of the serviceable item 100, etc.

Upon receipt of the code and/or any other information (e.g., a service report), the server 108 associates the code and any other received data with the serviceable item 100. Also, the server 108 establishes a temporary session identifier that the second electronic device 106 may use to establish a communication session with the server 108. The temporary session identifier may expire after a predetermined duration. If the temporary session identifier is expired, communication attempts from the second electronic device 106 using the temporary session identifier will not be accepted by the server 108.

In one embodiment, the temporary session identifier contains the code. For instance, the temporary session identifier may be a uniform resource locator (URL) having a domain name (top-level domain and second-level domain) followed by a path (e.g., a character sequence appended to the domain name after a forward slash, or "/"). The domain name may be for a website hosted by the server 108. In a typical implementation, the website relates to a company that manufactures, sells or services the serviceable item 100. The path may be or may include the code, and is configured to direct a web-browser of the second electronic device 106 to a specific webpage. The specific webpage may allow for the user 104 that interacted with user input 204 (as detected in block 500) to communicate with representatives 114 at the support center 112 and/or with automated features of the server 108 or computing platform 118.

Also upon receipt of the code and/or any other information, the server 108 and/or the computing platform 118 may take one or more predetermined automated actions. Exemplary actions may include establishing data communications with the serviceable item 100 and/or the first electronic device 102 to conduct diagnostic tests or collect data, alert a service representative in the field, alert a service representative 114 at the support center 112, etc.

In block 504, the temporary session identifier is output by the output device 208 and, in turn, may be input to the second electronic device 106. For instance, the temporary session identifier may be received by the second electronic device 106 if transmitted by the output device 208 or may be read or scanned if encoded into an image (e.g., QR code) and displayed by the output device 208 of the second electronic device 106. Input of the temporary session identifier to the second electronic device 106 may involve interaction with the second electronic device 106 by the user 104 to activate an appropriate wireless interface or scan the displayed image.

Prior to outputting the temporary session identifier, the first electronic device 102 must come into possession on the temporary session identifier. In one embodiment, the temporary session identifier is communicated from the server 108 to the first electronic device 102. Alternatively, the first electronic device 102 may be configured to generate the temporary session identifier by inserting the code into a predetermined URL format. In this embodiment, both the first electronic device 102 and the server 108 independently construct the temporary session identifier from the code.

In still another embodiment, the first electronic device 102 generates the temporary session identifier containing the code and transmits the complete temporary session identifier, in addition to or instead of the code, to the server 108. In this care, the server 108 need not independently construct the temporary session identifier.

The server 108 uses the temporary session identifier to establish a "cloud" service for the second electronic device 106. As will be appreciated, the temporary session identifier is a unique identity that is generated in or based on information from the first electronic device 102 after the user input 204 has been activated. In one embodiment, the temporary session identifier is randomized and cannot be easily guessed by a potential attacker. The temporary session identifier also may be short-lived to protect from replay attacks.

Once the second electronic device 106 acquires the temporary session identifier, the second electronic device 106 may be employed to present the user 104 with a mobile web page or other interactive features that are specifically associated with the user's interaction with the user input 204. For this purpose, the server 108 may execute logical instructions to interact with the second electronic device 106 to carry out service support functions for the serviceable item 100. It will be understood that some of the steps described as being carried out by the server 108 may be distributed across multiple computing devices in a computing environment (e.g., among the server 108 and computing platform 118) and reference to steps carried out by the server 108 specifically includes the possibility of distributed computing tasks.

The interaction of the server 108 with the second electronic device 106 may commence with the establishment of an active session with the second electronic device 106. At the second electronic device 106, steps to initiate the session may be carried out. For instance, input of the temporary session identifier to the second electronic device 106 may cause the second electronic device 106 to open or launch an application, such as a dedicated application or a standard web-browser. The application may use the temporary session identifier to connect to the server 108 and request the session. To initiate the session, user 104 interaction with the second electronic device 106, or user 104 authorization input, may be needed.

The session may remain active until closed by the second electronic device 106 or until the temporary session identifier expires. In another embodiment, the session may remain active following the expiration of the temporary session identifier, but no new information or data will be accepted from the second electronic device 106 after the expiration of the temporary session identifier unless the temporary session identifier is renewed or its expiration is extended based on the circumstances surrounding the service of the serviceable item 100.

As part of the session, the user 104 may be prompted to enter and submit contact information, such as a name, an email address, a telephone number or other information. The contact information may be used by the server 108 to send a notification to the user that the issue with the appliance has been resolved 100. The contact information also may be used for other post-resolution follow-up with the user 104, such as completing a satisfaction survey. The contact information also may be used by a representative 114 or automated process at the service center 112 to contact the user 104 to acquire more information about the problem with the serviceable item 100. Contact may be made through a text message, an email message, a telephone call, an instant message chat session, an audio chat, a video chat, or any other appropriate mechanism.

The user 104 also may be prompted to enter information about the issue being experienced with the serviceable item 100 to assist in generating a service report that may be used to direct appropriate action to resolve the issue. The information may be entered by typing in a description of the issue, by checking menu items, by answering of questions, etc. The information may be collected through a form arranged for the specific serviceable item 100. The user may be permitted to submit pictures taken with the second electronic device 106.

In one embodiment, the user 104 may be prompted to take certain actions with the serviceable item 100 to attempt to resolve the issue. For instance, the user 104 may be told where additional supplies are kept and/or how to stock supplies into the serviceable item 100. As another example, the user 104 may be asked to reset the serviceable item 100 or take some other action. The user also may be asked to establish a wired or wireless connection between the serviceable item 100 and the second electronic device 106. This may provide the server 108 with a communication pathway to acquire diagnostic information from the serviceable item 100 or update software or firmware of the serviceable item 100.

In one embodiment, the temporary session identifier is unique for each user 104 interaction with the user input 204 and leads to a unique session between the server 108 and the second electronic device 106. As a result, it is possible to setup a one-to-one interaction (e.g., a chat session) between the support center 112 and the user 104. Also, the disclosed approach may lead to faster and more satisfactory resolution of the problem with the serviceable item 100, may lead to fewer unneeded or avoidable dispatches of service personnel to the serviceable item 100, and/or may lead to fewer false problem reports by discouraging inappropriate use of the user input 204.

The manner in which the temporary session identifier is output from the first electronic device 102 to the second electronic device 106 may be a short-range interaction. For instance, the second electronic device 106 must be present at the first electronic device 102 to scan the displayed QR code, or within range of the first electronic device 102 for communication through Bluetooth, BLE or NFC. Also, the use of the temporary session identifier has advantages over the use of a static QR code that the user may scan with the second electronic device 106. A static QR code would require the user to login or to use a custom application to offer a secure connection between the server 108 and the second electronic device 106. Also, the static QR code may be scanned at one time and used at a second time when the user 104 is no longer nearby the serviceable item 100. The approach described herein is more secure since physical presence is needed to acquire the temporary session identifier and the temporary session identifier is operative for a predetermined duration. These aspects of the temporary session identifier allow for trustworthiness of the ensuing session between the second electronic device 106 and the server 108.

In an alternative approach, the first electronic device 102 need not communicate an association between the identity of the first electronic device 102 or the serviceable item 100 and the code and/or the temporary session identifier to the server 108. In this case the temporary session identifier is generated by the first electronic device 102 to include the identity of the first electronic device 102 or the serviceable item 100 and an authenticated session ID. The authenticated session ID may be generated from a shared secret key between first electronic device 102 and the server 108. The shared secret key may be configured to be hard to guess by an attacker.

Expanding on the foregoing alternative approach, this approach will be described in the context of FIG. 5. It will be observed that the first electronic device 102 need not communicate with the server 108 in this approach. Rather, the first electronic device 102 may generate data that is output to the second electronic device 106, which uses the data to communicate with the server 108 in an authenticated manner. In this approach, the first electronic device 102 need not support communication with the server 108 and the communications interface 202 may be omitted.

In this approach, at block 500, the first electronic device 102 detects the user interaction with the user input as previously described. Next, in block 502, the first electronic device 102 generates a code unique to the user interaction with the user input. For example, using the shared secret key known to the first electronic device 102 and the server 108, the first electronic device 102 generates a cryptographic key. When later received at the server 108, the cryptographic key authenticates the origin of the data as being from the first electronic device 102 at which the user 104 interacted with the user input 204 (e.g., by pressing a button). Expiration data related to the code also may be generated to reduce the possibility that the code is used at an unwarranted time. The expiration data may be an expiration time of the code or data from which the server 108 may determine an expiration time, such as a sequence ID (e.g., a sequence number) and/or the current date and/or time.

In block 504, the temporary session identifier may be output to the second electronic device 106 in any of the manners described above. In one embodiment, the temporary session identifier is the code or the code combined with a URL for the server 108 or other address information for the server 108. The temporary session identifier also may include the expiration data. The second electronic device 106 may communicate with the server 108 using the temporary session identifier, and the sever 108 may trust the use of the temporary session identifier by the second electronic device 106 due to the presence of the cryptographic key that is derived from the pre-shared secret key between the server 108 and the first electronic device 102.

Additional data also may be output to the second electronic device 106 with the temporary session identifier or following the output of the temporary session identifier. The additional data may be communicated by the second electronic device 106 to the server 106. The additional data may be, but is not limited to, one or more of an identity or location of the serviceable item 100, an identity or location of the first electronic device 102, a service report or service request, a predetermined reason of when the button should be used (e.g., for the user to request assistance, for the user to report a general problem with the serviceable item, for the user to report a specific type of problem with the serviceable item, for the user to report a certain type of consumable is depleted, etc.), information collected from a sensor at the serviceable item 100, or any other appropriate information.

The disclosed approaches have a number of advantages including, but not limited to, providing support for a "one click" user interaction to initiate service of the appliance followed by an interactive interaction with a service center 112; a specialized mobile application is not required; a log-in or user-authentication input is not needed; a secure session may be established using a combination of physical presence and timeliness; and support for a two way interaction between a service provider and the user.

Exemplary Embodiments

The following is a non-limiting description of exemplary embodiments, any one of which may be combined with any other embodiment or may be combined with any of the subject matter described above or may be combined with any of the subject matter described in the appended claims.

According to one aspect of the disclosure, a first electronic device associated with a serviceable item includes: a user input; a communication interface operative to establish communication with a server over a communications medium; an output device; and a control circuit, configured to: identify user interaction with the user input; generate a code unique to the user interaction with the user input; transmit, via the communication interface, the code to the server; and output, via the output device and to a second electronic device associated with the user, a temporary session identifier comprising the code, the temporary session identifier useable by the second device to establish a communication session with the server.

According to one embodiment of the first electronic device, the code comprises a random character sequence.

According to one embodiment of the first electronic device, the code is transmitted to the server with data identifying a state of the serviceable item at the time of the user interaction with the user input.

According to one embodiment of the first electronic device, the code is transmitted to the server with an identifier of the serviceable item.

According to one embodiment of the first electronic device, the output device comprises a near field communication (NFC) interface.

According to one embodiment of the first electronic device, the output device comprises a Bluetooth Low Energy (BLE) interface.

According to one embodiment of the first electronic device, the output device comprises a display.

According to one embodiment of the first electronic device, the display is a low power technology display, such as an electronic ink display.

According to one embodiment of the first electronic device, an address of the server (e.g., a uniform resource locator or URL) is communicated with the temporary session identifier from the first electronic device to the second device.

According to one embodiment of the first electronic device, the address of the server and temporary session identifier are encoded in a unique visual barcode that is output by the output device.

According to one embodiment of the first electronic device, the unique visual barcode is a quick response (QR) code.

According to one embodiment of the first electronic device, the temporary session identifier is part of the URL.

According to one embodiment of the first electronic device, the code transmitted to the server is encrypted.

According to one embodiment of the first electronic device, the temporary session identifier is formatted for use by an application of the second electronic device to establish a communication session with the server.

According to one embodiment of the first electronic device, the application of the second electronic device is a standard web browser.

According to another aspect of the disclosure, a method, performed by a first electronic device associated with n serviceable item, includes: identifying a user interaction with the first electronic device; generating a code unique to the user interaction; transmitting the code to a server; and outputting a temporary session identifier comprising the code, the temporary session identifier useable by a second electronic device associated with a user to establish a communication session with the server.

According to one embodiment of the method, the code comprises a random character sequence.

According to one embodiment of the method, the code is transmitted to the server with data identifying a state of the serviceable item at the time of the user interaction.

According to one embodiment of the method, the code is transmitted to the server with an identifier of the serviceable item.

According to one embodiment of the method, the temporary session identifier is output to the second electronic device over a near field communication (NFC) interface.

According to one embodiment of the method, the temporary session identifier is output to the second electronic device over a Bluetooth Low Energy (BLE) interface.

According to one embodiment of the method, the temporary session identifier is output to the second electronic device via a display.

According to one embodiment of the method, the display is a low power technology display, such as an electronic ink display.

According to one embodiment of the method, an address of the server (e.g., a uniform resource locator or URL) is communicated with the temporary session identifier from the first electronic device to the second device.

According to one embodiment of the method, the address of the server and temporary session identifier are encoded in a unique visual barcode that is output by the first electronic device.

According to one embodiment of the method, the unique visual barcode is a quick response (QR) code.

According to one embodiment of the method, the temporary session identifier is part of the URL.

According to one embodiment of the method, the code transmitted to the server is encrypted.

According to one embodiment of the method, the temporary session identifier is formatted for use by an application of the second electronic device to establish a communication session with the server.

According to one embodiment of the method, the application of the second electronic device is a standard web browser.

According to one embodiment of the method, the second electronic user device automatically launches an application responsive to receiving the temporary session identifier.

According to one embodiment of the method, the sever carries out: establishing, at a first time, an active session with the second electronic device using the temporary session identifier; receiving, at a second time, additional data from the application of the second electronic device; and verifying that a difference between the first time and the second time is within a predetermined value and, if so, accepting the additional data from the application of the second electronic device.

According to one embodiment of the method, the server carries out: transmitting, responsive to the accepting the additional data from the application of the second electronic device, update data.

According to another aspect of the disclosure, a system include: a server; and a first electronic device associated with a serviceable item, the first electronic device including a user input; a communication interface operative to establish communication with a server over a communications medium; an output device; and a control circuit, configured to: identify user interaction with the user input; generate a code unique to the user interaction with the user input; transmit, via the communication interface, the code to the server; and output, via the output device and to a second electronic device associated with the user, a temporary session identifier comprising the code, the temporary session identifier useable by the second device to establish a communication session with the server.

According to one embodiment of the system, the server is configured to: establish, at a first time, an active session with the second electronic device using the temporary session identifier; receive, at a second time, additional data from an application of the second electronic device; verify that a difference between the first time and the second time is within a predetermined value and, if so, accept the additional data from the application of the second electronic device.

CONCLUSION

Although certain embodiments have been shown and described, it is understood that equivalents and modifications falling within the scope of the appended claims will occur to others who are skilled in the art upon the reading and understanding of this specification.

What is claimed is:

1. A first electronic device associated with a serviceable item, comprising:
   a user input;
   an output device; and
   a control circuit, configured to:
     identify user interaction with the user input;
     generate a code unique to the user interaction with the user input;
     establish a temporary session with a server, the temporary session having a temporary session identifier, the temporary session identifier comprising the code, and the temporary session identifier being established for a second electronic device associated with the user to establish a communication session with the server using the temporary session identifier; and
     output, via the output device and to the second electronic device, the temporary session identifier.

2. The first electronic device according to claim 1, wherein the code comprises one of a random character sequence or a cryptographic key.

3. The first electronic device according to claim 1, wherein the code or the temporary session identifier is transmitted to the server by the first electronic device.

4. The first electronic device according to claim 1, wherein the temporary session identifier includes an authenticated session ID generated from a secret key shared between the first electronic device and the server.

5. The first electronic device according to claim 1, wherein the first electronic device transmits data identifying a state of the serviceable item at the time of the user interaction with the user input to the server.

6. The first electronic device according to claim 1, wherein the output device has limited operative range to output the temporary session identifier.

7. The first electronic device according to claim 6, wherein the display is a low power technology display.

8. The first electronic device according to claim 1, wherein the temporary session identifier is or is appendable to an address of the server.

9. A method, performed by a first electronic device associated with a serviceable item, comprising:
   identifying a user interaction with the first electronic device;
   generating a code unique to the user interaction;
   establishing a temporary session with a server, the temporary session having a temporary session identifier, the temporary session identifier comprising the code, and the temporary session identifier being established for a second electronic device associated with the user to establish a communication session with the server using the temporary session identifier; and
   outputting a the temporary session identifier to the second electronic device.

10. The method of claim 9, further comprising transmitting the code or the temporary session identifier to the server.

11. The method of claim 9, wherein the code comprises one of a random character sequence or a cryptographic key.

12. The method of claim 9, wherein the temporary session identifier includes an authenticated session ID generated from a secret key shared between first electronic device and the server.

13. The method of claim 9, further comprising transmitting data to the server identifying a state of the serviceable item at the time of the user interaction with the user input.

14. A server comprising:
    a communications interface; and
    a processor, the processor configured to:
      establish, using the communications interface, a temporary session with a first electronic device associated with a serviceable item, the temporary session having a temporary session identifier generated by the first electronic device, the temporary session identifier comprising a code generated by the first electronic device unique to a user interaction at the first electronic device; and
      establish, via the communications interface, a communication session with a second electronic device associated with the user, the communication session established with the temporary session identifier generated by the first electronic device.

15. The server according to claim 14, wherein the code comprises one of a random character sequence or a cryptographic key.

16. The server according to claim 14, wherein the temporary session identifier includes an authenticated session ID generated from a secret key shared between the first electronic device and the server.

17. The server according to claim 14, wherein the processor is further configured to receive, via the communications interface, data identifying a state of the serviceable item at the time of the user interaction from the first electronic device.

18. The first electronic device according to claim 6, wherein the output device comprises one of a near field communication (NFC) interface, a Bluetooth interface, a Bluetooth Low Energy (BLE) interface or a display on which an image encoded with the temporary session identifier is displayed.

19. The first electronic device according to claim 7, wherein the display is an electronic ink display.

20. The first electronic device according to claim 8, wherein the temporary session identifier is or is appendable to a uniform resource locator or URL.

\* \* \* \* \*